United States Patent [19]

Cremer

[11] Patent Number: 5,077,822
[45] Date of Patent: Dec. 31, 1991

[54] OPTICAL FILM OR STRIP WAVEGUIDE HAVING A DIELECTRIC WAVEGUIDING LAYER

[75] Inventor: Cornelius Cremer, Muenchen, Fed. Rep. of Germany

[73] Assignee: Siemens Aktiengesellschaft, Munich, Fed. Rep. of Germany

[21] Appl. No.: 585,526

[22] Filed: Sep. 9, 1990

[30] Foreign Application Priority Data

Sep. 22, 1989 [DE] Fed. Rep. of Germany ....... 3931705

[51] Int. Cl.$^5$ .............................................. G02B 6/10
[52] U.S. Cl. ..................................... 385/130; 385/11; 385/131
[58] Field of Search ............... 350/96.12, 96.13, 96.14, 350/96.29, 96.15

[56] References Cited

U.S. PATENT DOCUMENTS 4,695,123 9/1987 Chang et al. ..................... 350/96.15
4,886,332 12/1989 Wolfe ............................... 350/96.12
4,978,187 12/1990 Minemura et al. ........... 350/96.13 X

OTHER PUBLICATIONS

Yamamoto et al., "Characteristics of Optical Guided Modes in Multilayer Metal-Clad Planar Optical Guide With Low-Index Dielectric Buffer Layer", IEEE Journal fo Quantum Electronics, vol. QE-11, No. 9, (1975), pp. 729-736.

Rollke et al., "Metal-Clad Waveguide as Cutoff Polarizer for Integrated Optics", IEEE Journal of Quantum Electronics, vol. QE-13, No. 4 (1977), pp. 141-145.

Cowan et al., "Dispersion of Surface Plasmons in Multiple Metal and Dielectric Layers on Concave Diffraction Gratings", Phys. Stat. So. (1970), pp. 695-705.

Polky et al., "Metal-Clad Planar Dielectric Waveguide for Integrated Optics", Journal of the Optical Society of America, vol. 64, No. 3 (1974), pp. 274-279.

Primary Examiner—John D. Lee
Assistant Examiner—John Ngo
Attorney, Agent, or Firm—Hill, Van Santen, Steadman & Simpson

[57] ABSTRACT

In order for the waveguiding layer disposed on a substrate to handle both TE-polarized light and TM-polarized light, the arrangement includes a metal layer that is arranged close to the waveguiding layer so that the propagation speed of the TM-polarized photons (of the TE- and TM-polarized photons guided in the waveguiding layer) is reduced by the metal layer, whose thickness is selected so thin that the TE-polarized and the TM-polarized photons are still capable of propagation in the waveguiding layer. This new arrangement is particularly useful in integrated optical demultiplexers.

15 Claims, 1 Drawing Sheet

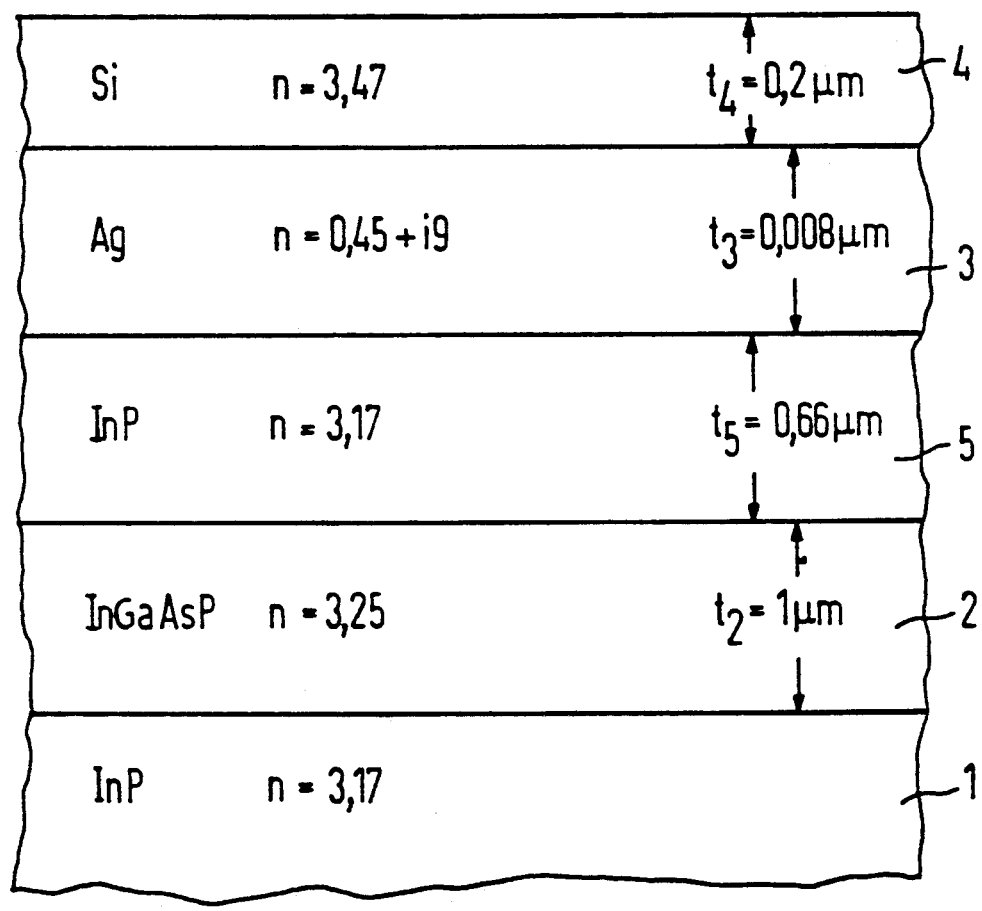

OPTICAL FILM OR STRIP WAVEGUIDE HAVING A DIELECTRIC WAVEGUIDING LAYER

BACKGROUND OF THE INVENTION

The present invention is directed to an improvement in an optical film or strip waveguide which has a dielectric waveguiding layer applied on a substrate.

Since the radiation received from a supplying optical fiber generally has an unknown polarization, components for the optical communication technology in most applications should be polarization-independent. The propagation speed of a light guided in the component, however, is polarization-dependent in optical films or strip waveguides having a dielectric waveguide layer, and this, among other things, represents a problem for wavelength-selective components of integrated optics. In these waveguides, the TM-polarized light guided in the waveguiding layer has a higher propagation speed than a TE-polarized light guided in this layer. This difference in the propagation speeds for the TM- and TE- polarized light can be reduced by reducing the discontinuity in the refractive index between the waveguiding layer and its environment. However, in order to obtain an optical guiding waveguide layer at all, a finite discontinuity in a refractive index is necessary and, thus, a certain polarization-dependency of the effective refractive index of the waveguiding layer is also unavoidable.

SUMMARY OF THE INVENTION

It is the object of the present invention to disclose how an optical film or strip waveguide having a waveguiding layer that has a discontinuity in the refractive index, vis-a-vis the environment, is to be designed so that the difference between the propagation speed of the TE-polarized light and the propagation speed of the TM-polarized light is reduced in the waveguiding layer.

To obtain these objects, the present invention is directed to an improvement in an optical film or strip waveguide having a dielectric waveguiding layer disposed on a substrate. The improvement is the provision of a metal layer that is arranged so close to the waveguiding layer that the propagation speed of the TM-polarized photons (of the TE- and the TM-polarized photons that are capable of propagation in the waveguiding layer) is reduced by the metal layer and that the thickness of the metal layer is selected so thin that the TE- and TM-polarized photons are still capable of propagation in the waveguiding layer.

Given correct dimensioning, the waveguide of the invention enables the disappearance of the difference and is based on the following perception. When a metal layer is brought close to the dielectric waveguiding layer, then the electrical or, respectively, magnetic fields guided in this layer can be differently influenced for each of the two mutually orthogonal polarization directions (TE and TM) so that the TE-polarized light and the TM-polarized light have the same propagation speed in the waveguiding layer so that this layer has the same, effective refractive index $n_{eff}$ for the TE-polarization as for the TM-polarization.

The intentional influence on only one polarization direction with the metal layer succeeds because what are referred to as surface plasmons that exist only for the TM polarization can propagate at the metal boundary surfaces. The propagation speed of the plasmons is essentially established by the thickness of the metal layer, the dielectric constant of the metal and the dielectric constant of the surrounding dielectrics. When the suitable material and layer thicknesses are selected, then plasmons can be generated that propagate in the waveguiding layer synchronously with the TM-polarized photons. On the basis of interaction between these two types of particles, the TM-photons of the dielectric waveguiding layer can then be "decelerated". The TE- and TM-polarized photons remain capable of propagation for metal layers of a thickness of about 10 nm and an additional attenuation of the guided wave can be pressed into the region of 5 dB/cm.

The metal layers on dielectric waveguides for the realization of the polarizers have already been frequently investigated. The TM-mode is thereby either absorbed by the ohmic losses in the metal (see, for example Y. Yamamoto, T. Kamiya, H. Yanai: "Characteristics of Optical Guided Modes in Multilayer Metal-Clad Planar Optical Guide with Low-Index Dielectric Buffer Layer", *IEEE Journal of Quantum Electronics*, Vol. QE-11 (1975) p. 729) or the TE-mode is brought under the cut-off of the dielectric waveguide due to the metal (see K. H. Rollke, W. Sohler: "Metal-Clad Waveguide as Cuttoff-Polarizer for integrated Optics", *IEEE Journal of Quantum Electronics*, Vol. QE-13, (1977), p. 141). Plasmons, on the other hand, have been observed at metal-coated gratings (see J. J. Cowan, E. T. Arakawa: "Dispersion of Surface Plasmons in Multiple Metal and Dielectric Layers on Concave Gratings", *Phys. Stat. Sol.* (a) 1 (1970) p. 695) and given prism infeed of light in metal layers (see A. Otto: "Excitation of Nonradiative Surface Plasma Waves in Silver by the Method of Frustrated Reflection", *Zeitschrift f. Physik*, Vol. 216 (1968) p. 398).

Let is also be pointed out that the propagation of light in media having attenuation is described by a complex refractive index that has a real part and an imaginary part. The real part dominates over the imaginary part, given an attenuating dielectric media. The imaginary part is equal to zero, when given an attenuation-free dielectric medium so that the refractive index of such a medium can be expressed by only the real part. In weakly attenuating metals, the imaginary part dominates over the real part. The real part is equal to zero, when given an attenuation-free metal, so that the refractive index of such a metal can be expressed only on the basis of the imaginary part.

Only surface plasmons having an effective refractive index $$n_{kl} = (n'^{-2}_k - n'^{-2}_l)^{-\frac{1}{2}}$$

can be guided at every boundary surface between a metal having an imaginary part $n'_l$ of its complex refractive index $n_l$ and a dielectric medium having a real part $n'_k$ of a complex refractive index $n_k$. These surface plasmons have the same polarization as TM-polarized photons of the dielectric waveguide. So that the surface plasmons can propagate, the amount of the imaginary part of the complex refractive index of the metal must be greater than the real part of the complex refractive index of the adjoining dielectric medium. For example, the surface plasmons have been observed at the boundary layer between silver and glass (see the previously-cited article by Yamamoto et al and the previously-cited article by Otto). An effective refractive index of 3.387, for example, derives from the boundary surface between silver and indium phosphide, when given a light wavelength of 1.5 μm for the plasmon.

What occurs for the dielectric waveguiding layer embedded between two dielectric mediums when the real parts of the complex refractive index of the material or of the materials of these mediums are respectively smaller than the real part of the complex refractive index of the material of the waveguiding layer is a higher effective refractive index for the TE-polarized wave, which is being guided in this layer, than for the TM-polarized wave being guided in this layer. For example, a difference of about 0.001 between the effective refractive index for the TE-polarized wave and the effective refractive index for the TM-polarized wave occurs for a layer of InGaAsP embedded in InP substrate the waveguide layer having a gap wavelength of 1.05 μm.

In order to be able to intentionally influence the photons of the TM-polarized wave, which is guided in the dielectric waveguiding layer by surface plasmons, it must be valid, viewed strictly for the TM-polarized wave with respect to the effective refractive index of the waveguiding layer that this effective refractive index is selected either lower than the lower of the two effective refractive indices for the surface plasmons at the boundary surfaces between the metal layer and the dielectric media adjoining this layer or higher than the higher of these two effective refractive indices for the surface plasmons.

All of the above demands can be obtained for a generally-known imaginary dispersion equation (see J. N. Polky, G. L. Mitchel, "Metal-Clad Planar Dielectric Waveguide for Integrated Optics", *J. Opt. Sco. Am.* Vol. 64(1974), p. 274).

In order to be able to influence photons guided in a waveguide layer with surface plasmons, both types of particles must have the same propagation speed, i.e., the same effective refractive index.

In order for the light to be able to propagate in the waveguiding layer of a film or strip waveguide with a propagation speed independent of the polarization, at least four different refractive indices $n_1$, $n_2$, $n_3$, $n_4$ that are complex, given attenuating materials must be present, whereof one must be the refractive index of a metal. An adequate condition therefor that the propagation speed of the light is independent of the polarization in the waveguiding layer is comprised in the dimension of the layer thickness $t_3$ of the metal layer that is to be selected essentially to:

BRIEF DESCRIPTION OF THE DRAWING

The FIG. is a cross sectional view through an exemplary embodiment of the polarization independent waveguide of the present invention.

DESCRIPTION OF THE PREFERRED EMBODIMENTS

The principles of the present invention are particularly useful when incorporated in a waveguide, shown in cross section in the Figure. The waveguide is useful in integrated optical demultiplexers.

The waveguide is composed of a substrate 1 of InP having a waveguiding layer 2 of InGaAsP applied thereon. A metal layer 3 of silver is arranged over the waveguiding 2 and has a cover or dielectric layer 4 of InP applied on the metal layer 3. At a respective light wavelength of 1.5 μm, the real part of the complex refractive index of the InP is 3.17 and the real part of the complex refractive index of the InGaAsP is 3.35. The complex refractive index of silver is 0.45+i9 (see the previously-cited article by Rollke et al). Accordingly, silver has only a slight auxiliary attenuation. Since silver is selected, the real part of the complex refractive index of the material of the cover layer 4 must lie approximately at 3. InP meets this demand. Silicon can also be employed for the cover layer 4, since the real part of the complex refractive index of silicon lies at 3.47, whereby this cover layer 4 must be thin, for example, must have a layer of thickness of about 200 nm. The cover layer 4 of silicon could be sputtered on, but would be too thin in order to form a dielectric waveguide and act on plasmons with $n_{eff}=3.22$ like a cover layer of InP.

In order to keep losses in the dielectric waveguide that occur as a consequence of dampening of the plasmons in the metal layer low, a buffer layer 5 of InP is additionally arranged between the waveguiding layer 2 and the metal layer 3 so that only a small part of the light guided in the waveguiding layer 2 is attenuated in the metal. When a thickness $t_2$ of 1 μm is selected for the waveguiding layer 2, then a thickness $t_5$ of the buffer layer 5 and the thickness $t_3$ of the metal layer 3 can be varied so that the effective refractive index of the TE-mode and of the TM-mode are the same.

In a concrete example, the 1 μm waveguiding layer 2 is composed of $In_{0.89} Ga_{0.11} As_{0.24} P_{0.76}$. The real part $n'_2$ of the complex refractive index $n_2$ of the material amounts to 3.25 for a light wavelength of 1.5 μm. The buffer layer 5 of InP has a thickness $t_5$ of 0.66 μm and $$t_3 = \frac{Tan^{-1}\left\{\frac{U_2}{U_3} \cdot \frac{n_3^2}{n_2^2} \tan\left(\tan^{-1}\left\{\frac{U_3}{U_2} \tan\left[\tan^{-1}\left(\frac{U_4}{iU_3}\right) - U_3 t_3\right]\right\} + Tan^{-1}\left(\frac{U_1}{iU_2}\right) - \tan^{-1}\left(\frac{U_1}{iU_2} \cdot \frac{n_2^2}{n_1^2}\right)\right)\right\} - \tan^{-1}\left(\frac{U_4}{iU_3} \cdot \frac{n_3^2}{n_4^2}\right)}{U_3}$$

wherein $U_j = 2\pi/\lambda(n_j^2 - n_{eff}^2)^{\frac{1}{2}}$, with j=1, 2, 3 and 4, λ denotes the wavelength of the light guided in the waveguiding layer and i denotes the imaginary unit.

Other advantages and features of the invention will be readily apparent from the following description of the preferred embodiments, the drawing and claims.

can be applied by a liquid phase epitaxy. The metal layer 3 of silver that can be applied by vapor-deposition onto the buffer layer 5 has a thickness of $t_3$ of 0.008 μm. The cover layer 4 applied by sputtering onto the metal layer 3 is composed of silicon.

A Bragg grating having a period of 0.24 μm can be additionally etched into the surface 1 of InP in order to be able to directly identify the effective refractive index of the waveguide with reference to the wavelength of the Bragg reflex.

Transmission from the conventional waveguide into a waveguide of the invention is advantageously higher than 99%. Only the wavelength-selective elements, therefore, have to be provided with a metal layer, for example, wavelength-selective elements of an integrated-optical demultiplexer.

Although various minor modifications may be suggested by those versed in the art, it should be understood that I wish to embody within the scope of the patent granted hereon all such modifications as reasonably and properly come within the scope of my contribution to the art.

I claim:

1. In an optical film or strip waveguide having a dielectric waveguiding layer disposed on a substrate for propagation of TM-polarized photons and TE-polarized photons, the improvements comprising a metal layer being arranged so close to the waveguiding layer that the propagation speed of the TM-polarized photons of the TE-and the TM-polarized photons being propagated in the waveguiding layer is reduced by the metal layer and the thickness of the metal layer being selected so that the TE- and TM-polarized photons are still capable of propagation in the waveguiding layer and the waveguiding layer has essentially the same effective refractive index for both the TE- and TM-polarized photons.

2. In an optical film or strip waveguide according to claim 1, wherein the metal layer is separated from the waveguiding layer by a dielectric layer.

3. In an optical film or strip waveguide according to claim 2, wherein the dielectric layer is a buffer layer composed of InP.

4. In an optical film or strip waveguide according to claim 1, wherein the substrate is of InP and the waveguiding layer is composed of InGaAsP and is applied directly on the substrate, the metal layer is composed of silver and has a thickness of 8 nm±5 nm, the metal layer, on a side facing away from the waveguiding layer, has a cover layer of a dielectric medium having a real refractive index above 3.

5. In an optical film or strip waveguide according to claim 4, wherein the dielectric medium of the cover layer is selected from a group consisting of In and Si.

6. In an optical film or strip waveguide according to claim 5, which includes a buffer layer of a dielectric material separating the metal layer from the waveguiding layer.

7. In an optical film or strip waveguide according to claim 6, wherein the buffer layer is composed of InP.

8. In an optical film or strip waveguide according to claim 4, wherein the metal layer is separated from the waveguiding layer by a dielectric layer.

9. In an optical film or strip waveguide according to claim 8, wherein said dielectric layer separating the metal layer from the waveguiding layer is composed of InP.

10. In an optical film or strip waveguide having a dielectric waveguiding layer being capable of propagation of TM-polarized and TE-polarized photons, the improvements comprising a metal layer being arranged so close to the waveguiding layer that the propagation speed of the TM-polarized photons of the TE- and the TM-polarized photons propagating in the waveguiding layer is reduced by the metal layer, said substrate being of InP, said waveguiding layer being composed of InGAaSp and being applied directly on the substrate, said metal layer being composed of silver and having a thickness of 8 nm±5 nm, said thickness being selected to enable the TE- and TM-polarized photons to still propagate in the waveguiding layer, and said metal layer on a side facing away from the waveguiding layer having a cover layer of a dielectric medium having a real refractive index of above 3.

11. In an optical film or strip waveguide according to claim 10, wherein the dielectric medium of the cover layer is selected from a group consisting of In and Si.

12. In an optical film or strip waveguide according to claim 11, which includes a buffer layer of a dielectric material separating the metal layer from the waveguiding layer.

13. In an optical film or strip waveguide according to claim 12, wherein the buffer layer is composed of InP.

14. In an optical film or strip waveguide according to claim 11, wherein the metal layer is separated from the waveguiding layer by a dielectric layer.

15. In an optical film or strip waveguide according to claim 14, wherein said dielectric layer separating the metal layer from the waveguiding layer is composed of InP.

* * * * *